Oct. 12, 1965  E. A. HOFFMAN  3,211,820
HOT LINE SUPPORT
Filed Aug. 19, 1964

United States Patent Office 3,211,820
Patented Oct. 12, 1965

3,211,820
HOT LINE SUPPORT
Edward A. Hoffman, 2410 Woodlawn Ave.,
Boise, Idaho
Filed Aug. 19, 1964, Ser. No. 390,544
9 Claims. (Cl. 174—5)

The present invention relates to an insulated support to be used in connection with work on energized electrical power lines. More specifically, the present invention relates to an insulated support for use in connection with by-passing operations during work on electrical devices, such as oil circuit breakers, reclosers, regulators, switches, and other similar devices which are connected to energized electrical power lines.

At the present time it is conventional to incorporate by-pass switches in electrical power lines to permit linemen to by-pass or bridge-out an item of electrical equipment which is connected to the line so that the piece of equipment may be repaired, adjusted, or replaced. The use of such conventional switches cannot be justified in many installations because of cost and the infrequent need for inspection, repair, or replacement of the apparatus. On the other hand, failure to provide such by-pass switches greatly complicates the future maintenance and other work which will be required on line equipment, even though such work is infrequent. Therefore, an alternative to the use of costly, conventional by-pass switching facilities is provided by utilizing metal hot line clamps carrying appropriate lead lines which are connected or disconnected from the energized power line. However, where such hot line clamps are used, present operational methods do not provide a means for the safe handling and support of high voltage jumper terminals and other leads during the by-passing operations.

It is therefore an object of the present invention to provide an insulated support for by-passing electrical devices connected to an energized electrical power line.

A further object of the present invention is to provide an economical means for by-passing electrical devices connected to energized power lines without the use of expensive by-pass switches.

A still further object of the present invention is to provide a simple, safe and inexpensive means to temporarily by-pass or bridge-out an electrical device connected to an energized power line during repair, adjustment, or replacement of such device.

Another object of the present invention is to provide an insulated support for a jumper terminal during temporary connection or disconnection of an energized single phase or polyphase power line to an item of line equipment.

A still further object of the present invention is to provide a simple, safe and inexpensive method to perform necessary operations of supporting the energized terminals of a by-pass line while connecting or disconnecting these terminals with the aid of a conventional hot line pole.

These and other objects and advantages of the present invention will be apparent from the following detailed description when read in conjunction with the drawings, wherein.

Figure 3:
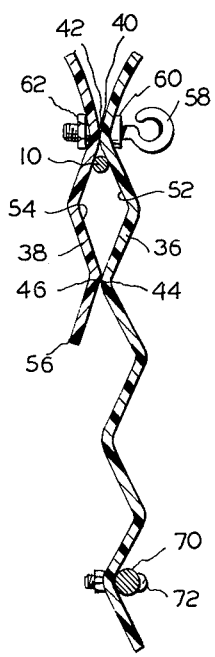
FIGURE 3 is a cross-sectional view of the support of FIGURE 2 taken along the line 3—3.

Referring now to the drawings, the numeral 10 refers to an energized electrical conductor or hot line which forms a part of a single phase or polyphase electrical power distribution system. Conductor 10 in the present instance is made up of segments 12 and 14, respectively, which are connected to one another by breaker insulator 16. An electrical power line device 18 is connected to hot line segments 12 and 14 by leads 20 and 22, respectively. Electrical device 18 includes any power line device, such as an oil circuit breaker, a recloser, a regulator, a switch, or any other similar device normally used on a distribution system for electrical power. Leads 20 and 22 are connected to hot line segments 12 and 14, respectively, through terminals 24 and 26, respectively, of electrical device 18, and hot line clamps 28 and 30, respectively. Hot line clamps 28 and 30 are shown schematically since these elements are well known and are connected to hot line segments 12 and 14 in accordance with known techniques. Supported on hot line segments 12 and 14 are a pair of hot line supports 32 and 34 of the present invention.

Figure 2:
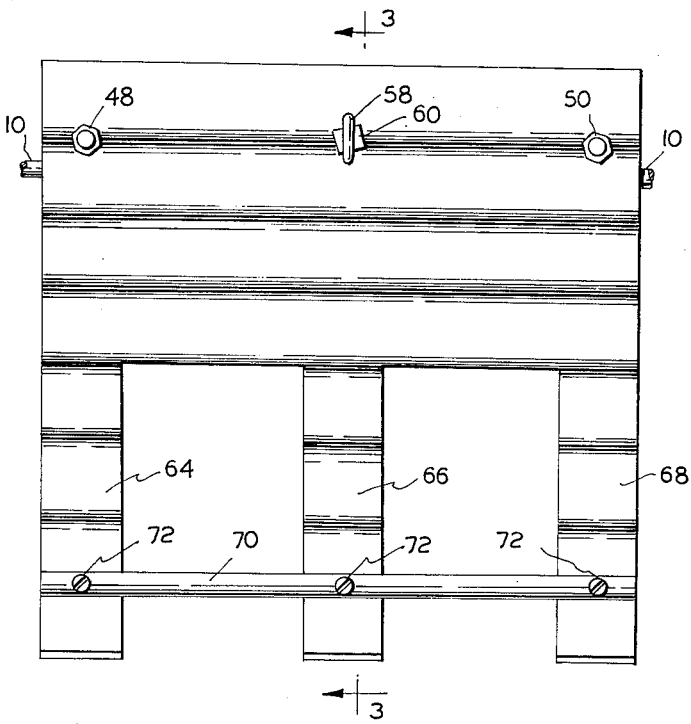
FIGURE 2 is a plan view in detail of the support of the present invention.

Hot line supports 32 and 34 of the present invention are shown in detail in FIGURES 2 and 3 of the drawings. In accordance with FIGURES 2 and 3, the hot line support is made up of two sheets, 36 and 38 respectively, of corrugated plastic or other non-conductive material. For reasons which will be pointed out hereinafter, sheet 38 is shorter than sheet 36. In any event, ridges 40 and 42 and 44 and 46 of sheets 36 and 38 are placed in contact with one another; and the upper ridges 40 and 42 clamped together by appropriate bolts and nuts 48 and 50. By rigidly clamping ridges 40 and 42 together, an eye-shaped, longitudinally-disposed passageway is formed by the opposing hollows 52 and 54 of sheets 36 and 38. Because of the resiliency of sheets 36 and 38, lower ridges 44 and 46 are in contact with one another but may be spread apart by appropriate pressure. The lower end 56 of sheet 38 and the opposing portion of sheet 36 form a flared receptacle to initially receive hot line 10. Hot line 10 then passes between ridges 44 and 46 as the support is forced downwardly over the hot line and then comes to rest at the top of the eye-shaped passageway formed by hollows 52 and 54. Also passing through ridges 40 and 42 sheets 36 and 38 is eye bolt 58 which is held in place by appropriate nuts 60 and 62. The eye of eye bolt 58 is designed to receive a conventional, insulated hot line pole or hot stick which is normally used to manipulate connectors and the like when attaching the same to an energized power line. The lower extremeity of sheet 36, which extends beyond the bottom of sheet 38, has formed therein at least one cutout. In the present, preferable device two cutouts are present in sheet 36 and form depending legs 64, 66 and 68. Spanning the cutouts in sheet 36 and thereby connecting the lower ends of legs 64, 66 and 68 is insulating bar 70. Insulating bar 70 is preferably made of plastic or Fiberglas, but may be made of wood or other non-conductive materials, and it is attached to legs 64, 66 and 68 by appropriate bolts and nuts 72.

Figure 1:
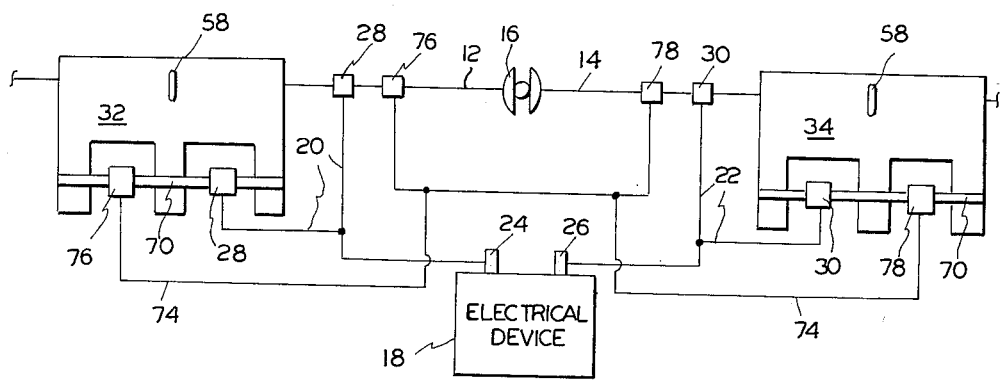
FIGURE 1 shows a conventional power line with an electrical device connected thereto and two of the supports of the present invention in use thereon.

Referring again to FIGURE 1 of the drawings, hot line supports 32 and 34 are suspended on power line segments 12 and 14 by suspending the supports on a hot stick through bolt 58 and then forcing the hot line between sheets 36 and 38, as previously explained. When it is desired to by-pass or bridge-out electrical device 18 for repair, adjustment, or replacement, an insulated by-pass cable 74 is connected to bar 70 of supports 32 and 34 through hot line clamps 76 and 78, respectively. Without turning off the power, hot line clamps 76 and 78 are then removed from bar 70 of supports 32 and 34 and connected to hot line segments 12 and 14, respectively. Thereafter, hot line clamps 28 and 30 are removed from hot line segments 12 and 14 and clamped on bar 70 of supports 32 and 34. The connection and disconnection of the various hot line clamps is, of course, made by means of a hot stick, in accordance with conventional practice. In any event, it may be seen that through the use of the hot line supports of the present invention an electrical device can be disconnected from a hot line for repair, adjustment, or replacement, without at any time interrupting the flow of power through the line and without any danger to the lineman because of dangling or unsupported lines. It is also to be seen that this temporary disconnection of electrical devices may be made with the hot line supports of the present invention without the use of complex or expensive additional equipment, with the exception of the conventional hot stick normally used in operations on energized power lines.

Having described my invention in detail and in its preferred embodiment, it should be understood that various modifications will be obvious to one skilled in the art without departing from the present invention which is to be limited only in accordance with the appended claims. For example, sheets 36 and 38 need not necessarily be corrugated so long as a generally flared passage is provided to initially receive the power line; the sheets are then held resiliently together in a manner to permit their being spread apart by pressure from the power line; and, finally, an elongated passageway is formed between the sheets to ultimately receive the power line and support the hot line device. Similarly, the depending legs of the support of this invention may take any form and be present in any number greater than two and the insulating support rod may be of any given configuration so long as the hot line clamps will fit over the rod and sufficient space is provided about the rod to manipulate the hot line clamps.

I claim:
1. An electrical conductor support comprising:
 (a) a first, generally-rectangular sheet of corrugated plastic having two ridges and one hollow;
 (b) a second, generally-rectangular sheet of corrugated plastic, equal in length to said first sheet and of greater width than said first sheet and having two of its uppermost ridges in contact with the said two ridges of said first sheet;
 (c) bolt means passing through said first and second sheets at the uppermost complementary ridges of each of said sheets and fixedly joining said sheets in back-to-back relationship;
 (d) eye bolt means passing through said uppermost complementary ridges of said sheets and perpendicular to said second sheet near the center of its said uppermost ridge;
 (e) three downwardly extending legs formed from said second sheet by two rectangular cutouts extending from the lowermost edge of said second sheet to a point adjacent the lowermost edge of said first sheet; and
 (f) an insulating, generally-cylindrical bar fixedly attached to said legs near their lower ends and spanning the spaces formed by said cutouts in said second sheet;
 (g) said sheets being adapted to receive an electrical conductor in the elongated passage formed by the two opposing uppermost hollows of said sheets and said bar being adapted to receive hot line clamps connected to other electrical conductors.
2. An electrical conductor support comprising:
 (a) an elongated, insulating receptacle means fixedly closed adjacent its upper end, then diverging near its center to form an elongated passageway and converging adjacent its lower end to form a resilient bottom closure;
 (b) said receptacle being formed to have its lower ends spread apart by an electrical conductor and, thereafter, to receive said conductor in said passageway and be supported thereon;
 (c) at least two insulating legs extending downwardly from said receptacle means and spaced along the length of said receptacle; and
 (d) an insulating bar joining said legs adjacent their lower ends and adapted to temporarily receive hot line clamps connected to other electrical conductors.
3. A support in accordance with claim 2 wherein the receptacle means is formed from two generally-rectangular sheets of insulating material fixedly joined at their upper edges.
4. A support in accordance with claim 3 wherein the sheets of insulating material are sheets of corrugated plastic.
5. A support in accordance with claim 3 wherein the legs are formed as extensions of one of said sheets of insulating material.
6. A support in accordance with claim 2 wherein an eye bolt, adapted to receive a hot stick, is attached to the receptacle means perpendicular thereto.
7. A support in accordance with claim 2 wherein the receptacle means diverges outwardly below the bottom closure to permit easy reception of an electrical conductor between the two portions of the receptacle.
8. A support in accordance with claim 2 wherein the insulating bar is a generally-cylindrical bar of wood approximately equal in diameter to the diameter of the electrical conductor on which the support is suspended.
9. An electrical conductor support comprising:
 (a) an elongated, insulating receptacle means formed by a pair of generally rectangular sheets of insulating material fixedly joined at their upper edges, then diverging near their centers to form an elongated passageway and thereafter converging adjacent their lower edges to form a resilient bottom closure;
 (b) said receptacle being formed to have its lower ends spread apart by an electrical conductor and thereafter to receive said conductor in said passageway and be supported thereon;
 (c) at least two insulating legs extending downwardly from one of said sheets of insulating material and spaced along the length of said sheet; and
 (d) an insulating bar joining said legs adjacent their lower ends and adapted to temporarily receive hot line clamps connected to other electrical conductors.

References Cited by the Examiner
UNITED STATES PATENTS
2,838,595 6/58 Parkyn _____ 174—138
3,149,390 9/64 McCoy _____ 174—5 X FOREIGN PATENTS
570,376 12/57 Italy.

JOHN F. BURNS, *Primary Examiner.*